Sept. 29, 1970         C. P. CARDANI ET AL         3,531,232
              METHODS OF SECURING TWO PARTS TOGETHER
Original Filed Feb. 18, 1965                    2 Sheets-Sheet 1
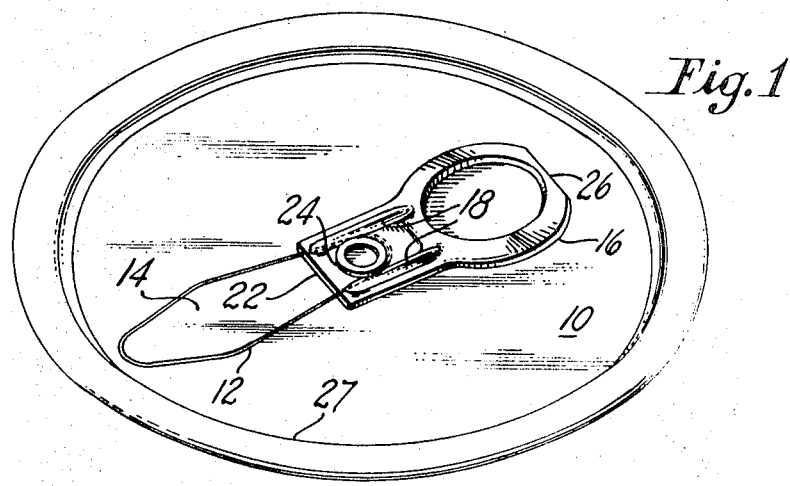
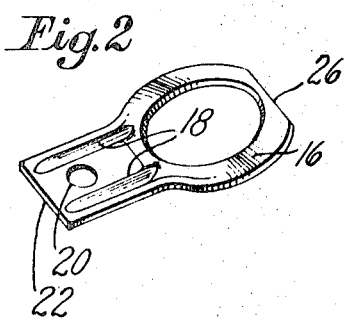
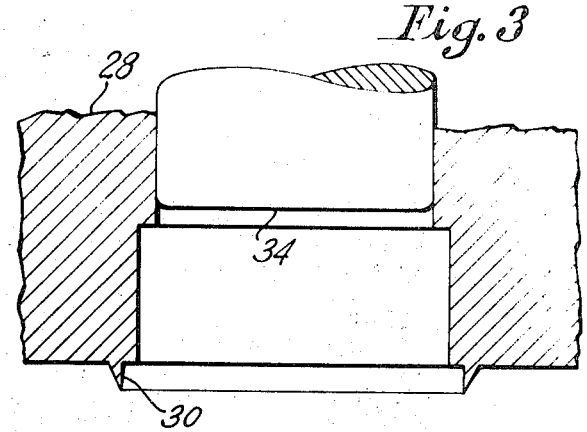
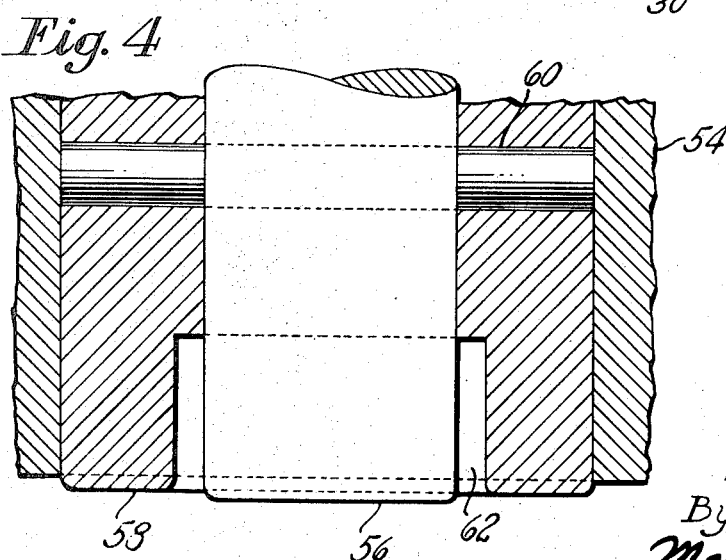
Inventors:
Charles P. Cardani
Raymond L. Peterson
By their Attorney

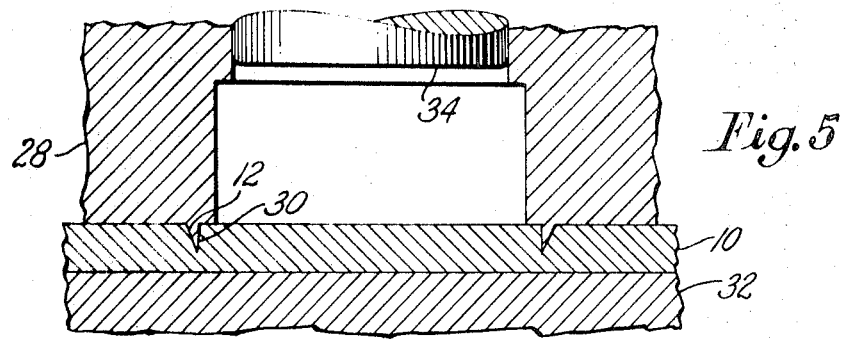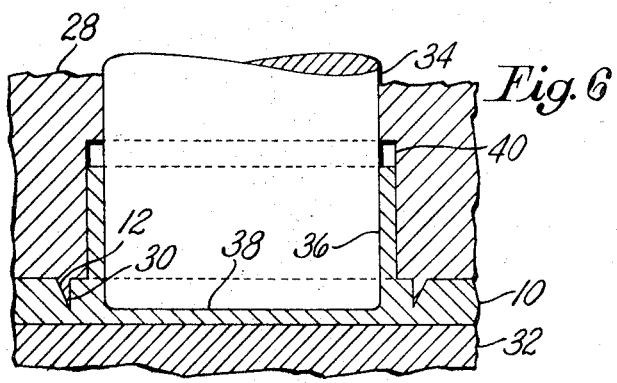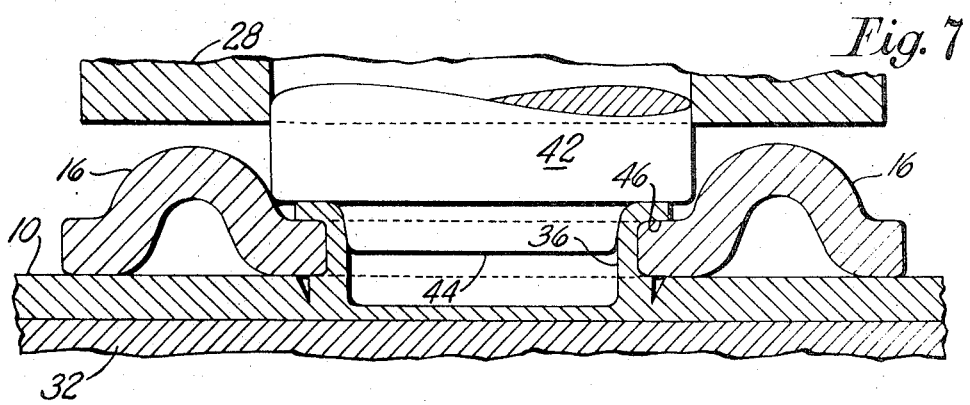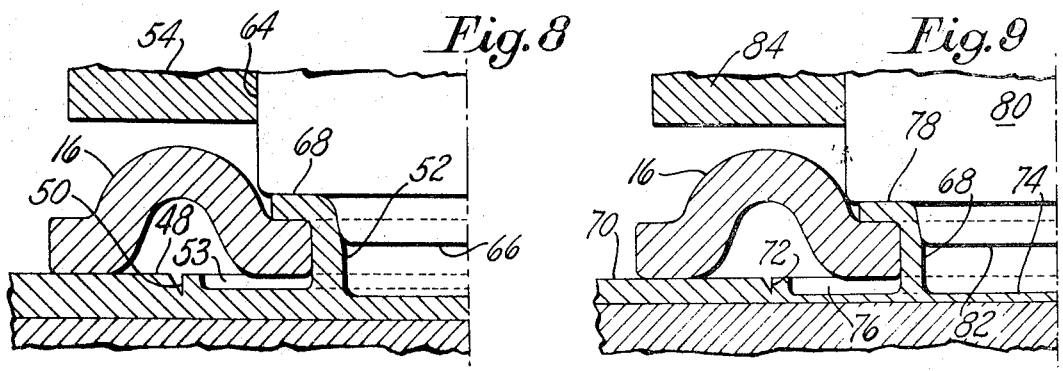

United States Patent Office 3,531,232
Patented Sept. 29, 1970

3,531,232
METHODS OF SECURING TWO PARTS TOGETHER
Charles P. Cardani, South Hamilton, and Raymond L. Peterson, Beverly Farms, Mass., assignors to USM Corporation, Flemington, N.J., a corporation of New Jersey
Original application Feb. 18, 1965, Ser. No. 433,646, now Patent No. 3,343,714, dated Sept. 26, 1967. Divided and this application June 5, 1967, Ser. No. 643,693
Int. Cl. B21d 51/00, 39/00; B23p 11/00
U.S. Cl. 113—121    3 Claims

ABSTRACT OF THE DISCLOSURE

A method of securing two parts together such as an opening tool to a can top in which an integral tubular rivet is formed on the can top by locally thinning an area of the can top by a high energy rate forming blow and guiding the displaced material to form a tubular rivet which is thereafter headed to secure the tool.

---

The present application is a division of application for U.S. Letters Patent Ser. No. 433,646, filed Feb. 18, 1965 now Letters Patent No. 3,343,714, granted Sept. 26, 1967.

This invention relates generally to methods of forming metallic fasteners. More particularly, the present invention relates to methods of forming fasteners which are especially useful for attaching opening tools to removable portions or panels of metallic cans.

In the assembly of an opening tool to a can top, for example, such as that disclosed in U.S. Letters Patent No. 3,084,835, issued Apr. 9, 1963 upon an application of John E. Walsh, there are certain characteristics of the fastening between the tool and the tear-out portion which produce the most desirable assembly from the economic and structural points of view. From the economic standpoint it is essential that the fastener lend itself to being produced at high rates of speed so as to match the output of high speed production of can tops.

From the structural point of view it is necessary that the fastening have sufficient strength to remain firmly attached to the tear-out section while the opening tool is manipulated to remove said section. In addition, the shape of the fastening must be such that there are no localized stresses or weak points created in the can top material whereby the contents if pressurized could cause the can to rupture or to leak. The matter of localized weakness is particularly difficult to cope with if at the same time the stock thickness of the can top is reduced to a minimum for purposes of economy as in the present practice.

It is accordingly an object of the present invention to provide a method of fastening component parts such as an opening tool to a container cover with economy of time, materials and tools.

Another object is to provide a method of fastening such parts together securely enough for the intended purposes.

Still another object is to form an integral fastening without appreciably weakening the part in which the fastening is formed and without requiring the use of material of special thickness in order to obtain the necessary resistance to internal pressures.

The objects of the invention are realized by a fastening formed integral with the can top blank from material displaced from the blank. The fastening is in the form of a backwardly extruded tubular rivet, the material for which is provided by locally reducing the thickness of the blank adjacent the fastening. According to the invention the fastening is produced by high energy rate forming methods and the formation of the fastening may be accomplished at the same station in a die by which a score line is incised in the blank to define the removable portion thereof.

The foregoing objects and numerous advantages of the invention will best be understood from the following detailed description of an illustrative embodiment taken in connection with the accompanying drawings in which:

FIG. 1 is a view in perspective as seen generally from the top of an easy open can top assembly including an opening tool secured to the cam top by a fastening according to the present invention;

FIG. 2 is a detail view in perspective of a can opening tool or lever also seen in FIG. 1;

FIG. 3 is a fragmentary view in section of a portion of a punch for performing a combined scoring and fastener extruding operation in a can top;

FIG. 4 is a fragmentary view in section of a portion of a punch for forming a fastening according to the present invention but modified to meet certain environmental conditions and without combining the scoring operations;

FIG. 5 is a fragmentary view in section of the punch depicted in FIG. 3 having already scored a can end but before being actuated to form the fastening;

FIG. 6 is a view similar to FIG. 5 but taken after the fastening has been formed;

FIG. 7 is a fragmentary view in cross section showing the fastening of FIG. 6 at a later work station being headed to secure an opening tool or lever to a can top;

FIG. 8 is a fragmentary view in half section showing the heading of a fastening formed by a tool such as that depicted in FIG. 4; and FIG. 9 is a view in half section showing the heading of a fastening similar to that depicted in FIG. 8.

Turning now to the drawings, particularly FIG. 1, a can top assembly manufactured according to the invention comprises a can top proper designated by the reference numeral 10, depicted in a form most suitable for beverages or other liquids. As such it is formed with a continuous score line 12 defining a tear-out section or panel 14. It will of course be appreciated that the form of the tear-out section is here shown for purposes of illustration only and that the fastener according to the invention is also applicable to other shapes of removable sections or strips located either in a can top or elsewhere on a container wall. Attached to the tear-out section 14 is an opening tool or lever 16 generally of the shape disclosed in the above-identified Walsh patent. Before assembly with a can top, the lever 16 is completely formed and includes among its features a pair of longitudinal stiffening ribs 18, a perforation 20 and a pivot edge or fulcrum 22. In use the lever 16 is secured to the removable portion 14 of the can top 10 by a fastening or integral rivet 24 and is used as a second class lever for initiating rupture along the score line 12 and for progressive removal of the panel 14. This is done by raising the lever 16 by its effort end 26 and as the lever pivots on its opposite end 22, causes an initial rupture along the score line 12 and the rupture continues to elongate with further pull on this lever until the panel is removed.

The processing of the can top assembly may begin with a can top blank having a peripheral sealing channel 27 already formed by conventional beading rolls, for example. Thereafter the blank is scored to define the panel 14 either before or at the same time that the fastener 24 is formed. Processing of cover blanks of average thickness (i.e. from about .009 inch to about .025 inch) is preferably carried out in the manner depicted in FIGS. 3, 5 and 6 in which there are shown operating instrumentalities including a die block 28 formed with an integral incising ridge 30 having the outline of the score line 12. As seen in FIG. 5 the cover blank 10 is supported on a stationary die member or anvil 32, and the die block 28 pressed into engagement with the upper surface of the blank at normal high speed press velocities. There is slidably mounted in the die block 28 an impact punch 34 which remains raised in the die block and out of contact with the blank 10 as the die block in engaging the blank incises the score line 12. The punch 34 is then actuated under impact while the die block 28 remains in engagement with the blank 10 with the incising ridge 30 embedded therein. The combination of scoring and fastener forming steps at a single press station offers the advantage of greater control over the flow of material being displaced by the impact punch 34 than would otherwise be possible. The greater control stems from the fact that the ridge 30 in penetrating the thickness of the blank to form the score 12 acts as a dam to prevent the outward metal flow particularly of soft materials, such as aluminum, away from the point of punch impact.

As shown in FIG. 6, a generally tubular upstanding integral rivet 36 is back extruded by displacing material from the normal thickness of the cover blank in a thinned section 38 inside the rivet. The back extrusion occurs by propelling the punch 34 at a velocity of between 20 and 150 feet per second employing propelling devices well known in the high energy metal forming art. As a result of striking the upper surface of the blank 10 at high velocity and with limited force, the metal displaced from the thinned portion 38 flows around the punch 34 and into an annular cavity 40 defined by a counterbore surrounding the punch 34 and of sufficient depth to accommodate with clearance the maximum height of rivet 36 formed by displacement of material from the thinned section 38. The thickness of the section 38 is limited by a conventional integral stop (not shown) on the punch 34 engaging the die block 28. The speed of impact of the punch varies within the limits already set forth in accordance with the characteristics of the material being formed. Thus the lower velocities are adequate for soft aluminum whereas velocities at the upper end of the range have been found suitable for operating upon mild steel can stock. A typical result of operating upon a can top blank 10 of 5086–H36 or 5154–H38 aluminum having a thickness of .015″, the thickness of which is reduced to approximately .005″ at the thinned section 38 yields a rivet having an outside diameter of approximately 5/32″, a wall thickness of .006″ and a height of approximately 3/64″. When such an integral rivet is properly headed, as will hereinafter be described, it has a holding power adequate to retain a lever 16 attached to the can top for the removal of the panel 14.

Either as an operation in a separate die or preferably at another station of the same die block 28, the rivet 36 is headed over or flanged to secure a key 16 to the can top 10. The key 16 is preferably fed and automatically positioned with its perforation 20 around the rivet 36 by automatic devices which are not a part of the present invention. After the lever 16 has been positioned on the rivet 36 an appropriately formed heading punch 42 formed with a tapered pilot 44 enters the straight tubular rivet 36, gradually spreads the upper end of the rivet and diverts it horizontally to form a head or flange 46 over the lever 16 attaching the latter to the can top 10.

The procedure already described in which a die including the incising ridge 30 is employed offers the advantages of reducing the number of stations and assuring the proper positioning of the fastening with respect to the score line 12. The advantage of relative positioning of the fastening and score lines is reduced in importance, however, by making the fastener central in the cover and so designing the score line that the fastening retains its required orientation inside the score line regardless of the angular orientation of the length of the removable panel.

The punch depicted in FIG. 4 is designed for forming a tubular rivet similar to that already described but with a greater wall thickness as seen in FIG. 8. This modification is particularly useful in a cover blank 48 in which a score line 50 is shallower than that indicated at 12 so as to enclose the container material having a high pressure such as carbonated or malt beverages. The same effect as the shallow score line may be obtained by employing a stronger material, for example, mild steel as opposed to aluminum for the can top 10. The result of either shallower scoring or tougher material is that a greater force is required to be applied to the lever 16 to initiate rupture and this in turn requires the thicker wall of a rivet 52 depicted in FIG. 8. In order to obtain the greater thickness, material is displaced not only from the center of the rivet 52 but also from an annular recess 53 around the rivet.

The tool for producing thick-walled fasteners is shown in FIG. 4 and comprises a die block 54 which applies pressure to the blank 48 before the integral tubular rivet 52 is raised by a high energy rate forming impact blow. The impact tool shown in its most depressed position in FIG. 4 comprises a central punch 56 secured inside a tubular punch 58 by a pin 60. At its lower end the punch 58 is counterbored to provide an annular cavity 62 having a depth greater than the full height of the rivet 52 to receive the rivet 52 being formed in the same manner as the rivet 38 is received within the cavity 40 as shown in FIG. 6. In order to obtain the greatest possible wall thickness with a minimal local weakening of the cover 48, the punch 56 extends below the tubular punch 58 so that the thickness of the cover undergoes a greater reduction inside the tubular rivet 52 than in the annular recess 53.

As in the case of the tubular rivet 36, after the rivet 52 has been formed by the tool depicted in FIG. 4, there is a heading operation shown in FIG. 8. For this purpose there is also fixedly mounted in the block 54 a heading punch 64 formed with a tapered pilot 66 which enters the interior of the rivet. By first spreading the upper end of the rivet 52 and then diverting it horizontally over the lever 16, the punch 64 forms a head or flange 68 securing the lever which may be applied manually but preferably by an automatic feeding device as already indicated. It will be noted that the score 50 shown in FIG. 8 is formed neither by the punch of FIG. 4 nor that of FIG. 8. The score may be formed either at an intermediate station or a prescored can top blank in which the pattern of the score at its inward end has a portion concentric with the central location of the rivet 52 may be employed.

In FIG. 9 there is shown another alternative construction in which an integral tubular rivet 68 is formed on a can top 70 of relatively thin material, either steel or aluminum. Such thin stock is desirable for reasons of economy in the use of material particularly in conjunction with containers intended to be filled with a content at atmospheric pressure, at a very low pressure or under vacuum. The can top 70 is scored at 72 to a depth leaving a thinner root thickness than the score 50 for obvious reasons. Material for the formation of the rivet 68 is obtained by reducing the thickness of the can top inside the rivet at 74 and also by forming an annular recess 76 surrounding the rivet. It will be noted that the remaining thicknesses at the bottom of the inside of the rivet 68 and of the recess 76 are substantially equal and amount to less than half the original thickness of the cover blank. Typically, the original thickness of the cover 70 may be .010″ thick, scored to a depth of .006 and with the remaining thickness in the central area 74 and the recess 76 being approximately .004. The material thus provided yields a rivet of essentially the same proportions as that depicted in FIG. 6 and already described in detail. The rivet 68 is formed by a tool similar to that depicted in FIG. 4 except that the lower end of the central punch and the tubular punch corresponding to the punches 56 and 58 respectively are essentially co-planar. After the rivet 68 has been formed to essentially the shape depicted in FIG. 6, a lever 16 is applied to the rivet which is then headed over at 78 as shown in FIG. 9. The heading operation is accomplished by a punch 80 having a pilot 82 which enters the interior of the tubular rivet. The punch 80 is mounted in a die block 84 and accomplishes the formation of the head 78 as already described for the heads 46 and 68.

It is seen from the foregoing examples that a fastening according to the present invention may be produced for average conditions as depicted in FIGS. 6 and 7 by reducing the thickness of the can top only on the inside of the fastening. In the showing of FIG. 6 the scoring is accomplished at the same press station as the formation of the tubular rivet so that the starting material may be an unscored can top blank and the finished product an easy open top including a removable panel, an opening lever or other tool and a fastening according to the present invention, securing the opening tool to its removable panel. According to a modification the wall thickness of the fastening may be increased by forming an annular recess surrounding the tubular rivet at the same time that the can top thickness inside the rivet is reduced to a greater extent. An alternative which is readily apparent from the foregoing disclosure is that the wall thickness need not be uniform. By making the central opening eccentric with the outside of the tubular rivet, greater wall thickness and hence greater strength of fastening may be obtained along the length of the lever or other point of maximum stress. Finally, an equal reduction in thickness inside the rivet and in a recess surrounding the rivet may be employed especially in a can top of reduced thickness intended for low pressure applications.

It will be appreciated from the foregoing detailed description that the present invention is not limited to the specific embodiments already described but is susceptible to being utilized in modified form by those of ordinary skill in the art. For example, fastenings according to the present methods may be useful for attaching can opening tools other than second class levers to can tops and indeed for securing together parts other than can components. It is, therefore, intended that the foregoing detailed description be taken by way of example and that the scope of the invention be limited only by the appended claims.

Having thus described our invention, what we claim as new and desire to secure by Letters Patent of the United States is:

1. A method of forming an integral fastener on a work piece of generally uniform thickness comprising the steps of embedding incising means within said work piece to define a portion of the work piece within which the fastener is to be formed and to prevent outward flow of material from the portion of the work piece defined by the incising means, locally thinning an area of the work piece within said defined portion by a high energy rate forming blow, at the same time guiding the material displaced from the locally thinned area to form an integral tubular rivet adapted to being headed to secure to the work piece a perforated part disposed about the rivet, said rivet having an open outer end and a base formed by a portion of the work piece having a reduced thickness.

2. A method of forming an integral fastener on an easy open can top comprising the steps of providing a can top blank, embedding incising means within said can top to define a portion within which the fastener is to be formed and a removal portion and to prevent outward flow of material from the portion of the can top defined by the incising means, locally thinning an area of the blank within said defined portion by a high energy rate forming blow, guiding the blank material displaced from the locally thinned area to form an integral tubular rivet adapted to being headed to secure a perforated opening tool disposed about the rivet, said rivet having an open outer end and a base formed by a portion of the work piece having a reduced thickness.

3. A method of forming an integral fastener on an easy open can top comprising the steps of providing a can top blank, embedding incising means within said can top to define a portion within which the fastener is to be formed and a removable portion and to prevent outward flow of material from the portion of the can top defined by the incising means, locally thinning a circular area and annular area of the blank concentric with the circular area, each within said defined portion, by a single high energy rate forming blow thereby displacing material of the blank in the direction opposite to that of the blow, guiding the displaced blank material between the circular area and the annular area into the form of an integral tubular rivet, said rivet having an open outer end and a base formed by a portion of the work piece having a reduced thickness, and thereafter placing a perforated opening tool in telescoping relationship with said tubular rivet before the step of heading the tubular rivet to secure the opening tool to the removable portion.

References Cited

UNITED STATES PATENTS

| | | | |
|---|---|---|---|
| 1,655,916 | 1/1928 | Neuberth. | |
| 3,176,872 | 4/1965 | Zundel. | |
| 3,200,226 | 8/1965 | Cooley. | |
| 3,300,080 | 1/1967 | Close | 220—54 |
| 3,301,433 | 1/1967 | Wade | 113—121 X |
| 3,031,748 | 5/1962 | Focht | 29—522 X |
| 2,953,247 | 9/1960 | Walter et al. | |

CHARLIE T. MOON, Primary Examiner

U.S. Cl. X.R.

29—509, 522; 10—27